US006806964B2

(12) United States Patent
Yamamoto et al.

(10) Patent No.: US 6,806,964 B2
(45) Date of Patent: Oct. 19, 2004

(54) OPTICAL RECORDING AND/OR REPRODUCTION APPARATUS, TRACKING METHOD, AND OPTICAL RECORDING MEDIUM

(75) Inventors: Hiroaki Yamamoto, Hyogo (JP); Teruhiro Shiono, Osaka (JP); Tetsuo Saimi, Hirakata (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 275 days.

(21) Appl. No.: 10/157,741

(22) Filed: May 29, 2002

(65) Prior Publication Data

US 2002/0179814 A1 Dec. 5, 2002

(30) Foreign Application Priority Data

May 29, 2001 (JP) ........................................ 2001-161491

(51) Int. Cl.[7] ................................................ G01B 9/02

(52) U.S. Cl. ...................................... 356/499; 356/521

(58) Field of Search ............................... 356/458, 494, 356/499, 521; 369/44.14, 112.03, 112.04, 112.07, 112.1, 112.15

(56) References Cited

U.S. PATENT DOCUMENTS 5,923,635 A * 7/1999 Yamanaka ................ 369/112.1
6,111,842 A * 8/2000 Nishino et al. ........... 369/112.1

FOREIGN PATENT DOCUMENTS

JP           404289533 A  * 10/1992

* cited by examiner

Primary Examiner—Samuel A. Turner
(74) Attorney, Agent, or Firm—Renner, Otto, Boisselle & Sklar, LLP

(57) ABSTRACT

An optical recording and/or reproduction apparatus includes: a light source for emitting a first light beam; an optical system for outputting first and second diffracted light beams and a second light beam; and a controlling section for controlling the optical system, wherein the first and second diffracted light beams interfere with each other to generate interference fringes which extend in a direction substantially perpendicular to a recording layer of an recording medium, the optical recording and/or reproduction apparatus further includes a detection section for detecting the interference fringes reflected by the guiding portion so as to output a detection signal, and the control section controls the optical system based on the detection signal such that the optical spots follow at least either of concave portions and convex portions of the guiding portion.

12 Claims, 14 Drawing Sheets

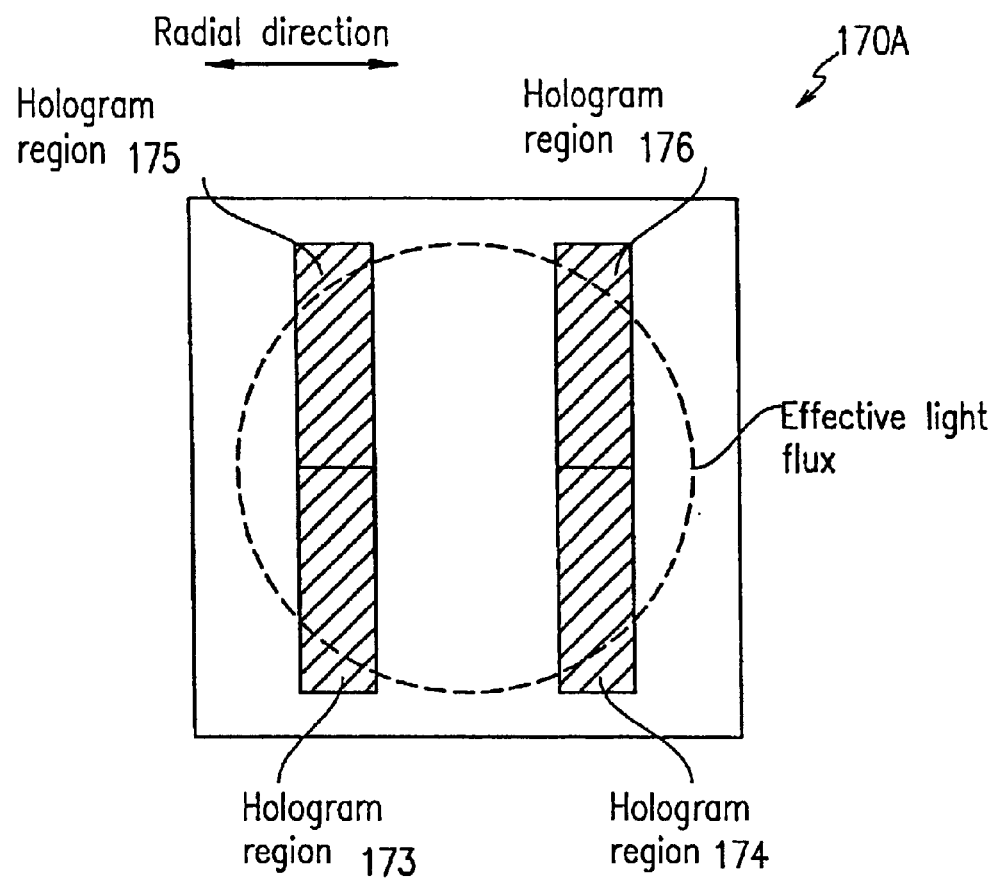

OPTICAL RECORDING AND/OR REPRODUCTION APPARATUS, TRACKING METHOD, AND OPTICAL RECORDING MEDIUM

BACKGROUND OF THE INVENTION

1. Field of the Invention

The present invention relates to an optical recording and/or reproduction apparatus which optically performs recording and reproduction of information on an optical recording medium, such as an optical disc, optical card, etc.

2. Description of the Related Art

In recent years, as our society has become more information-intensive, an external storage device having a larger capacity has been in increasing demand. In an optical recording of information, a recording density cannot be infinitely increased by reducing the size of a recording pit because of a diffraction limit which is defined by the wavelength of light and the numerical aperture of an objective lens. In order to address such a problem, an optical recording medium having a three-dimensional structure where information is recorded not only on one two-dimensional recording plane but on multiple recording layers superimposed along a direction perpendicular to the two-dimensional plane (optical axis direction), and an optical recording and/or reproduction apparatus have been proposed (Japanese Laid-Open Publication No. 6-28672). FIG. 12 shows an example of a conventional optical recording and/or reproduction apparatus for recording information on/reproducing information from an optical recording medium having a three-dimensional structure.

The optical recording and/or reproduction apparatus 1200 shown in FIG. 12 includes: a light source 101; a beam splitter 360; an objective lens 103; a three-axes stage 761 on which a photosensitive material 760A for recording information is mounted; and a detection section 130. In the photosensitive material 760A, information is three-dimensionally recorded.

As shown in FIG. 12, a laser beam emitted by the light source 101, which is a semiconductor laser, is converged on the photosensitive material 760A by the objective lens 103. In this example, a LiNbO$_3$ crystal, which is a photorefractive crystal, is used as the photosensitive material 760A. The refractive index of the LiNbO$_3$ crystal is changed in relation to a differential value of the intensity distribution of light. The light intensity on the optical axis is proportional to the square root of D (D$^{1/2}$), where D denotes the distance from the focal point. Accordingly, a variation of the refractive index in the crystal, which occurs when the laser beam is converged on the photosensitive material 760A, is proportional to the cube root of D (D$^{1/3}$), where D denotes the distance from the focal point. As a result, a variation of the refractive index in the crystal occurs only in the vicinity of a point where the laser beam is converged. With such a variation in the refractive index, information can be three-dimensionally recorded in the photosensitive material (crystal) 760A.

In reproduction of information recorded three-dimensionally in the photosensitive material 760A, a laser beam emitted by the light source 101 is converged at a portion where the refractive index has been varied, and light reflected from that portion is detected by the detection section 130, whereby the three-dimensionally recorded information is reproduced. The three-axes stage 761 is used to move the entire photosensitive material 760A such that the laser beam is converged at a portion in the entire photosensitive material 760A where a desired information is to be recorded.

However, in the above technique, since the three-axes stage 761 is used for positional control in order to achieve three-dimensional recording of information in the photosensitive material 760A, the following problems occur. Firstly, the information recording density in the photosensitive material 760A is limited due to the mechanical precision of the three-axes stage 761. Secondly, moving the entire photosensitive material 760A by using the three-axes stage 761 cannot be achieved speedily, and accordingly, recording/reproduction times become long. Thirdly, when the photosensitive material 760A is replaced with another, the relative positions of the photosensitive material 760A and the three-axes stage 761 are shifted, so that three-dimensionally recorded in formation cannot be read out.

In an optical recording and/or reproduction apparatus for recording information on/reproducing information from an optical recording medium, such as an optical disc or the like, the recording or reproduction time can be shortened by rotating the optical recording medium at a high speed, for example. In order to control a recording position, the position of a guiding groove, which is formed in the optical recording medium at the time of production thereof, is detected by using a push-pull method, a three-beam method, or the like. An objective lens is driven according to the position of the detected guiding groove, whereby the recording position is controlled. The recording position on the optical recording medium and the position of the guiding groove formed on the optical recording medium do not shift even when the recording medium is replaced with another. Thus, replacement of recording media is possible.

However, in such a conventional method for controlling a recording position employed for an optical recording medium, information cannot be recorded in a portion where no guiding groove is formed, although information can be recorded in a portion where a guiding groove is formed.

SUMMARY OF THE INVENTION

According to one aspect of the present invention, there is provided an optical recording and/or reproduction apparatus for use with an optical recording medium, the optical recording medium including a recording layer and a substrate which has a guiding portion where concave portions and convex portions are periodically formed along a predetermined direction, the optical recording and/or reproduction apparatus comprising: a light source for emitting a first light beam; an optical system for diffracting a portion of the first light beam so as to output a first diffracted light beam and a second diffracted light beam, and for converging the other portion of the first light beam, thereby outputting a second light beam so as to be converged at a predetermined convergence point; and a controlling section for controlling the optical system, wherein the first and second diffracted light beams interfere with each other to generate interference fringes which extend in a direction substantially perpendicular to the recording layer, the interference fringes include bright portions and dark portions which occur alternately along the predetermined direction, the optical system outputs the first and second diffracted light beams and the second light beam such that the bright portions of the interference fringes form light spots on the guiding portion when the predetermined convergence point of the second light beam is present within the recording layer, the optical recording and/or reproduction apparatus further includes a detection section for detecting the interference fringes reflected by the guiding portion so as to output a detection signal, and the control section controls the optical system based on the detection signal such that the optical spots follow at least either of the concave portions and the convex portions.

In one embodiment of the present invention, the recording layer includes a plurality of recording planes; and the control section controls the optical system such that the predetermined convergence point of the second light beam is positioned on one of the plurality of recording planes.

In another embodiment of the present invention, the frequency of the interference fringes is equal to the frequency at which the concave portions and convex portions are formed.

In still another embodiment of the present invention, the frequency of the interference fringes is a half of the frequency at which the concave portions and convex portions are formed.

In still another embodiment of the present invention, the optical system is positioned at an opposite side to the recording layer with respect to the guiding portion.

In still another embodiment of the present invention, the optical system is positioned at the same side as the recording layer with respect to the guiding portion.

In still another embodiment of the present invention, the detection section further detects the second light beam reflected by the recording layer so as to output the detection signal; and the optical recording and/or reproduction apparatus further includes a reproduction section for reproducing information recorded in the recording layer based on the detection signal.

In still another embodiment of the present invention, the optical recording and/or reproduction apparatus further includes a recording section for generating a recording current which is used for recording information on the recording layer, wherein the light source emits the first light beam based on the recording current.

According to another aspect of the present invention, there is provided a tracking method for use with an optical recording medium, the optical recording medium including a recording layer and a substrate which has a guiding portion where concave portions and convex portions are periodically formed along a predetermined direction, the method comprising steps of: (a) emitting a first light beam; (b) diffracting a portion of the first light beam so as to output a first diffracted light beam and a second diffracted light beam, and for converging the other portion of the first light beam, thereby outputting a second light beam so as to be converged at a predetermined convergence point; and (c) controlling the optical system, wherein the first and second diffracted light beams interfere with each other to generate interference fringes which extend in a direction substantially perpendicular to the recording layer, the interference fringes include bright portions and dark portions which occur alternately along the predetermined direction, the step (b) includes a step of (d) outputting the first and second diffracted light beams and the second light beam such that the bright portions of the interference fringes form light spots on the guiding portion when the predetermined convergence point of the second light beam is present within the recording layer, the tracking method further includes a step of (e) detecting the interference fringes reflected by the guiding portion so as to output a detection signal, and the step (c) includes a step of (f) controlling the optical system based on the detection signal such that the optical spots follow at least either of the concave portions and the convex portions.

According to still another aspect of the present invention, there is provided an optical recording and/or reproduction apparatus for use with an optical recording medium, the optical recording medium including a recording layer and a substrate which has a guiding portion where concave portions and convex portions are periodically formed along a predetermined direction, the optical recording and/or reproduction apparatus comprising: a light source for emitting a first light beam; an optical system for diffracting a portion of the first light beam so as to output a first diffracted light beam, a second diffracted light beam, a third diffracted light beam, and a fourth diffracted light beam, and for converging the other portion of the first light beam, thereby outputting a second light beam so as to be converged at a predetermined convergence point; and a controlling section for controlling the optical system, wherein the first and second diffracted light beams interfere with each other to generate first interference fringes which extend in a direction substantially perpendicular to the recording layer, the third and fourth diffracted light beams interfere with each other to generate second interference fringes which extend in a direction substantially perpendicular to the recording layer, the first and second interference fringes include bright portions and dark portions which occur alternately along the predetermined direction, the frequency of the first interference fringes and the frequency of the second interference fringes are shifted with respect to each other along the predetermined direction, the optical system outputs the first, second, third, and fourth diffracted light beams and the second light beam such that the bright portions of the first and second interference fringes form light spots on the guiding portion when the predetermined convergence point of the second light beam is present within the recording layer, the optical recording and/or reproduction apparatus further includes a detection section for detecting the first and second interference fringes reflected by the guiding portion so as to output a detection signal, and the control section controls the optical system based on the detection signal such that the optical spots follow at least either of the concave portions and the convex portions.

According to still another aspect of the present invention, there is provided an optical recording medium comprising: a substrate having a guiding portion in which concave portions and convex portions are formed; and m recording layers (m is an integer equal to or greater than 2 (m≧2)), where information is recorded in the m recording layers by irradiation of light, wherein the m recording layers includes: a first recording layer, which is a furthest recording layer from a surface of the recording medium on which the light is incident; a mth recording layer, which is a closest recording layer to the surface of the recording medium on which the light is incident; nth and (n−1)th recording layers (n is an integer equal to or greater than 2 and equal to or smaller than m (2≦n≦m)), the nth recoding layer being closer to the surface of the recording medium on which the light is incident than the (n−1)th recoding layer is, the nth and (n−1)th recording layers satisfy the following relationships:

$R_{n-1} > R_n$ and $A_{n-1} > A_n$, where $R_n$ and $R_{n-1}$ respectively denote the reflectances of the nth and (n−1)th recoding layers, and $A_n$ and $A_{n-1}$ respectively denote the light absorptances of the nth and (n−1)th recoding layers.

In one embodiment of the present invention, the first and nth recording layers satisfy the following relationships:

$$R_n = R_1/n$$

$$A_n = A_1/n$$

$$R_1 + A_1 = 1$$

where $R_n$ and $R_1$ respectively denote the reflectances of the nth and first recoding layers, and $A_n$ and $A_1$ respectively denote the light absorptances of the nth and first recoding layers.

In another embodiment of the present invention, the concave portions and convex portions are periodically formed along the predetermined direction; and the concave portions and convex portions reflect the light.

According to still another aspect of the present invention, there is provided an optical recording and/or reproduction apparatus for use with an optical recording medium, the optical recording medium including a plurality of recording layers and a substrate which has a guiding portion where concave portions and convex portions are periodically formed along a predetermined direction, the optical recording and/or reproduction apparatus comprising: a light source for emitting a first light beam; an optical system for diffracting a portion of the first light beam so as to output a first diffracted light beam and a second diffracted light beam, and for converging the other portion of the first light beam, thereby outputting a second light beam so as to be converged at a predetermined convergence point; and a controlling section for controlling the optical system, wherein the first and second diffracted light beams interfere with each other to generate interference fringes which extend in a direction substantially perpendicular to the plurality of recording layers, the interference fringes include bright portions and dark portions which occur alternately along the predetermined direction, the optical system outputs the first and second diffracted light beams and the second light beam such that the bright portions of the interference fringes form light spots on the guiding portion when the predetermined convergence point of the second light beam is present within one of the plurality of recording layers, the optical recording and/or reproduction apparatus further includes a detection section for detecting the interference fringes reflected by the guiding portion so as to output a detection signal, and the control section controls the optical system based on the detection signal such that the optical spots follow at least either of the concave portions and the convex portions.

According to still another aspect of the present invention, there is provided a tracking method for use with an optical recording medium, the optical recording medium including a plurality of recording layers and a substrate which has a guiding portion where concave portions and convex portions are periodically formed along a predetermined direction, the method comprising steps of: (a) emitting a first light beam; (b) diffracting a portion of the first light beam so as to output a first diffracted light beam and a second diffracted light beam, and for converging the other portion of the first light beam, thereby outputting a second light beam so as to be converged at a predetermined convergence point; and (c) controlling the optical system, wherein the first and second diffracted light beams interfere with each other to generate interference fringes which extend in a direction substantially perpendicular to the plurality of recording layers, the interference fringes include bright portions and dark portions which occur alternately along the predetermined direction, the step (b) includes a step of (d) outputting the first and second diffracted light beams and the second light beam such that the bright portions of the interference fringes form light spots on the guiding portion when the predetermined convergence point of the second light beam is present within one of the plurality of recording layers, the tracking method further includes a step of (e) detecting the interference fringes reflected by the guiding portion so as to output a detection signal, and the step (c) includes a step of (f) controlling the optical system based on the detection signal such that the optical spots follow at least either of the concave portions and the convex portions.

Thus, the invention described herein makes possible the advantages of (1) providing an optical recording and/or reproduction apparatus capable of performing high-accuracy tracking control of a light beam used for recording/reproduction of information on an optical recording medium having a plurality of recording layers or recording planes and a method for performing such a tracking control; and (2) providing an optical recording medium including a plurality of recording layers where the intensities of light beams reflected from the recording layers are constant.

These and other advantages of the present invention will become apparent to those skilled in the art upon reading and understanding the following detailed description with reference to the accompanying figures.

BRIEF DESCRIPTION OF THE DRAWINGS

FIG. 9A is a plan view showing a hologram element according to an embodiment of the present invention.

DESCRIPTION OF THE PREFERRED EMBODIMENTS

Hereinafter, embodiments of the present invention will be described with reference to the drawings.

(Embodiment 1)

Figure 1:
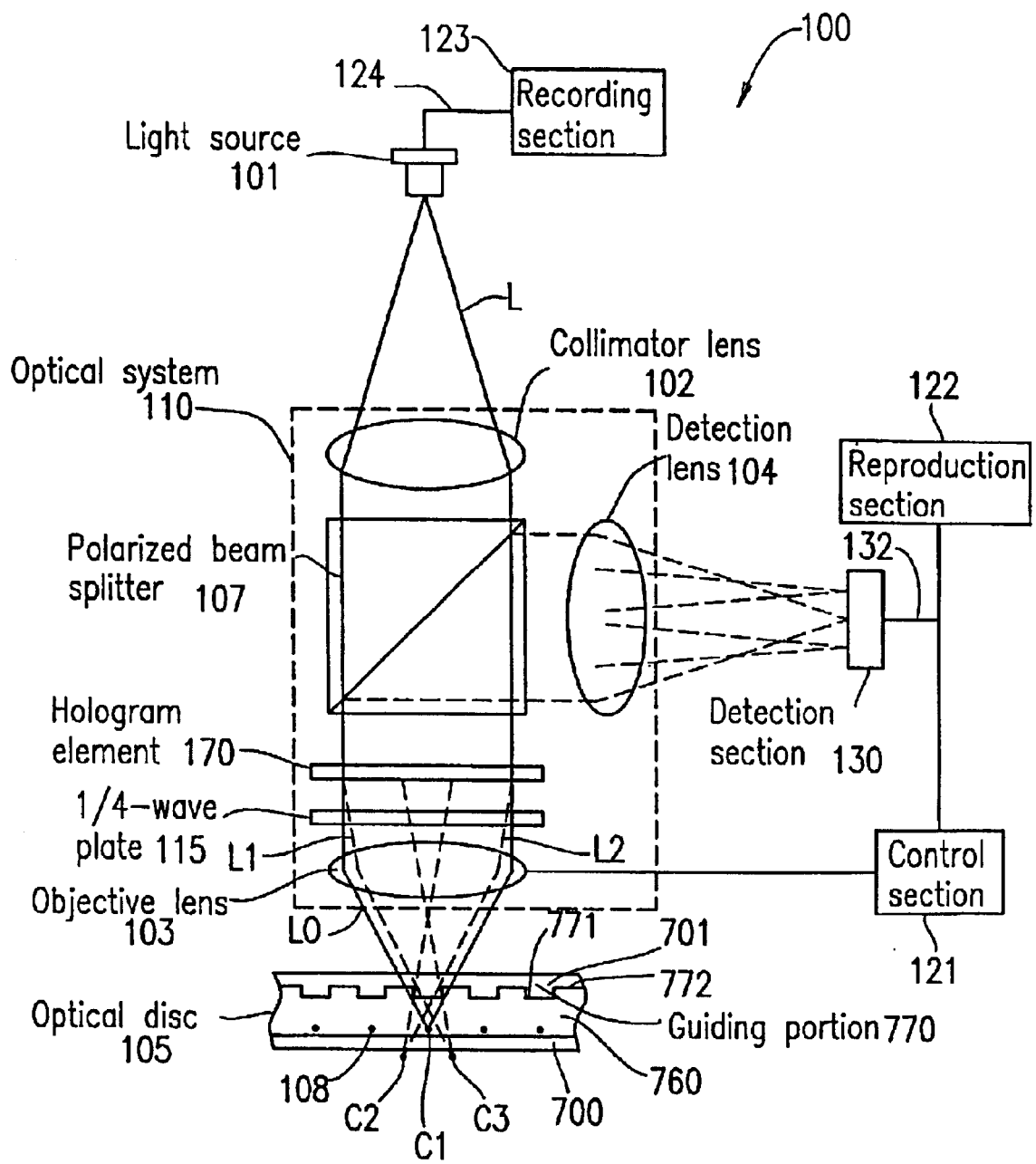
FIG. 1 shows an optical recording and/or reproduction apparatus according to an embodiment of the present invention.

FIG. 1 shows an optical recording and/or reproduction apparatus 100 according to embodiment 1 of the present invention. The optical recording and/or reproduction apparatus 100 performs recording of information on, and reproduction of information from, an optical disc (optical recording medium) 105.

The optical disc 105 includes substrates 700 and 701 and a recording layer 760. The recording layer 760 contains a photosensitive material. The substrate 701 has a guiding portion 770. In the guiding portion 770, concave portions 771 and convex portions 772 are formed periodically along a radial direction of the optical disc 105.

The optical recording and/or reproduction apparatus 100 includes: a light source 101, which is a semiconductor laser that emits a light beam L; an optical system 110 which diffracts a portion of the light beam L so as to output diffracted light beams L1 and L2 such that the diffracted light beams L1 and L2 forms a light beam L0 converged at a predetermined convergence point C1; and a control section 121 for controlling the optical system 110.

The optical system 110 includes a collimator lens 102, a polarized beam splitter 107, a hologram element 170, a ¼-waveplate 115, an objective lens 103, and a detection lens 104. The optical system 110 is positioned at an opposite side to the recording layer 760 with respect to the guiding portion 770.

Because of interference of the diffracted light beams L1 and L2, interference fringes S (FIG. 3) which extend in a direction substantially perpendicular to the recording layer 760 occur. The interference fringes S include bright portions S1 and dark portions S2 which alternately occur along the radial direction of the optical disc 105. The optical system 110 outputs the diffracted light beams L1 and L2 and the light beam L0 such that the bright portions S1 of the interference fringes S form light spots 820 (FIG. 4A) on the guiding portion 770 when the convergence point C1 of the light beam L0 is present within the recording layer 760.

The optical recording and/or reproduction apparatus 100 further includes the detection section 130 which detects the interference fringes S reflected by the guiding portion 770 and outputs a detection signal 132. The control section 121 controls the optical system 110 based on the detection signal 132 such that the light spots 820 follow at least either of the concave portions 771 and the convex portions 772. Herein, control of the optical system 110 refers not only to moving the position of the entire optical system 110, but also to moving at least a portion of the optical system 110 (e.g., moving only the objective lens 103).

The optical recording and/or reproduction apparatus 100 further includes: a recording section 123 which generates a recording current 124 for recording information on the recording layer 760; and a reproduction section 122 for reproducing information recorded on the recording layer 760.

Figure 2A:
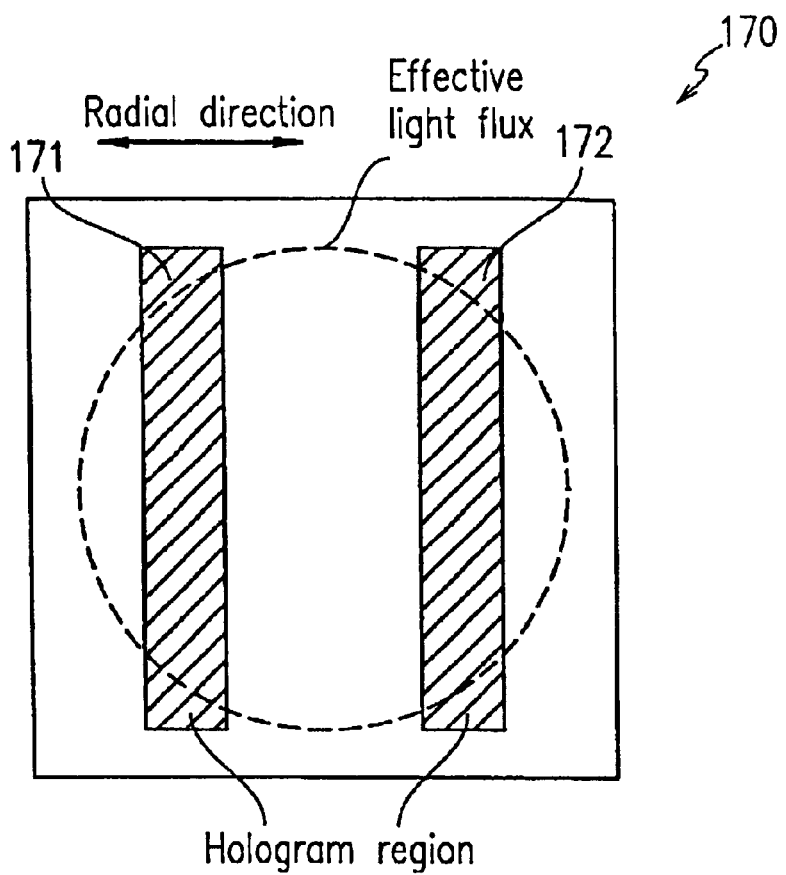
FIG. 2A is a plan view showing a hologram element according to an embodiment of the present invention.

FIG. 2A is a plan view showing the hologram element 170 according to embodiment 1 of the present invention. The hologram element 170 has hologram regions 171 and 172.

The light beam L, which is a linearly polarized light beam emitted by the light source 101 by the recording section 123 based on the recording current 124, is converted into a parallel light beam by the collimator lens 102 and transmitted through the polarized beam splitter 107. The light beam L enters the hologram element 170.

A portion of the light beam L is diffracted by the hologram regions 171 and 172 so as to generate the diffracted light beams L1 and L2. The remainder of the light beam L is transmitted through a region of the hologram element 170 other than the hologram regions 171 and 172 so as to become the light beam L0. The light beam L0 is converged by the objective lens 103 so as to converge at the convergence point C1. The diffracted light beams L1 and L2 are converged by the objective lens 103 so as to converge at convergence points C2 and C3.

In the optical recording and/or reproduction apparatus 100 according to embodiment 1, focusing of the light beam L0 is achieved by mechanically controlling the optical system 110 with the control section 121. The control section 121 controls the optical system 110 such that the convergence point C1 of the light beam L0 is present within the recording layer 760, whereby information is recorded at a position in the recording layer 760 which corresponds to the convergence point C1. At the position in the recording layer 760 which corresponds to the convergence point C1, for example, a recording mark 108 which represents information is formed. The recorded information can be reproduced by the reproduction section 122 based on a light beam reflected from the recording mark 108 and detected by the detection section 130.

Figure 2B:
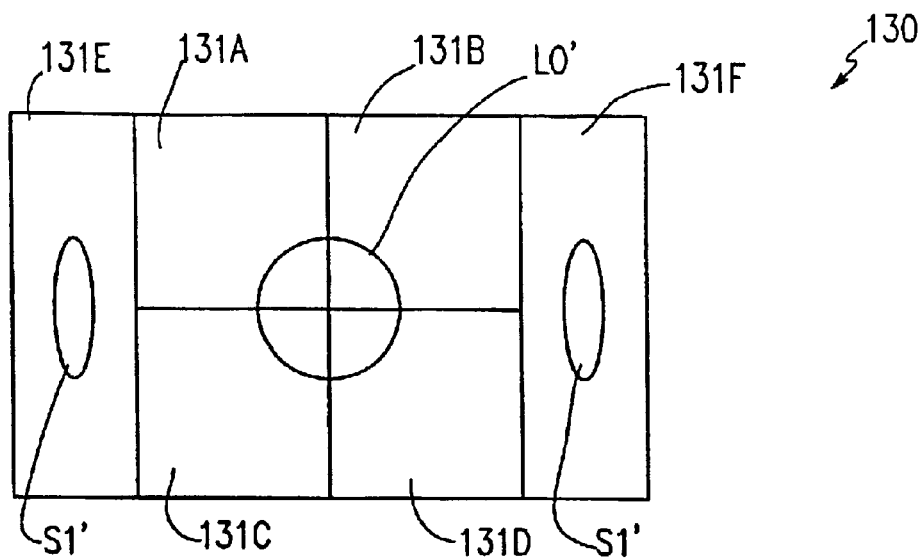
FIG. 2B is a plan view showing a detection section according to an embodiment of the present invention.

The light beam L0 reflected by recording mark 108 is converted by the objective lens 103 into a parallel light beam, and then converted by the ¼-wave plate 115 into a linearly polarized beam. The linearly polarized beam enters the polarized beam splitter 107. Due to the function of the ¼-wave plate 115, the polarization direction of the light beam L0 in a returning path is perpendicular to that of the light beam L0 in a coming path, and accordingly, the light beam L0 is efficiently reflected by the polarized beam splitter 107. The light beam Lo reflected by the polarized beam splitter 107 is converged by the detection lens 104 and enters the detection section 130. The detection section 130 detects the light beam L0. FIG. 2B shows the detection section 130. The detection section 130 has six light receiving sections 131A, 131B, 131C, 131D, 131E, and 131F. The light beam L0 incident on the detection section 130 forms a light spot L0'. The light receiving sections 131A, 131B, 131C, and 131D output a detection signal 132 according to the intensity of the light beam L0 incident thereon. The reproduction section 122 reproduces information recorded on the recording layer 760 based on the detection signal 132.

The detection signal 132 may be produced according to the intensity distribution of the light spot L0'. Furthermore, in the case where the recording marks 108 are formed at a constant depth in the recording layer 760, focusing of the light beam L0 may be achieved based on the intensity distribution of the light spot L0' using an astigmatic method.

The guiding portion 770 (FIG. 1) reflects the interference fringes S (FIG. 3) formed due to interference of the diffracted light beams L1 and L2. The reflected interference fringes S are detected by the detection section 130 as well as the light beam L0. Since the diffracted light beams L1 and L2 are diffracted by the hologram element 170, the reflected interference fringes S enter the detection section 130 at positions different from the portion where the light spot L0 is formed (i.e., the light receiving sections 131E and 131F), so as to form light spots S1' therein as shown in FIG. 2B. The light receiving sections 131E and 131F output a detection signal 132 according to the interference fringes S incident thereon.

Next, a tracking method according to embodiment 1 of the present invention is described.

Figure 3:
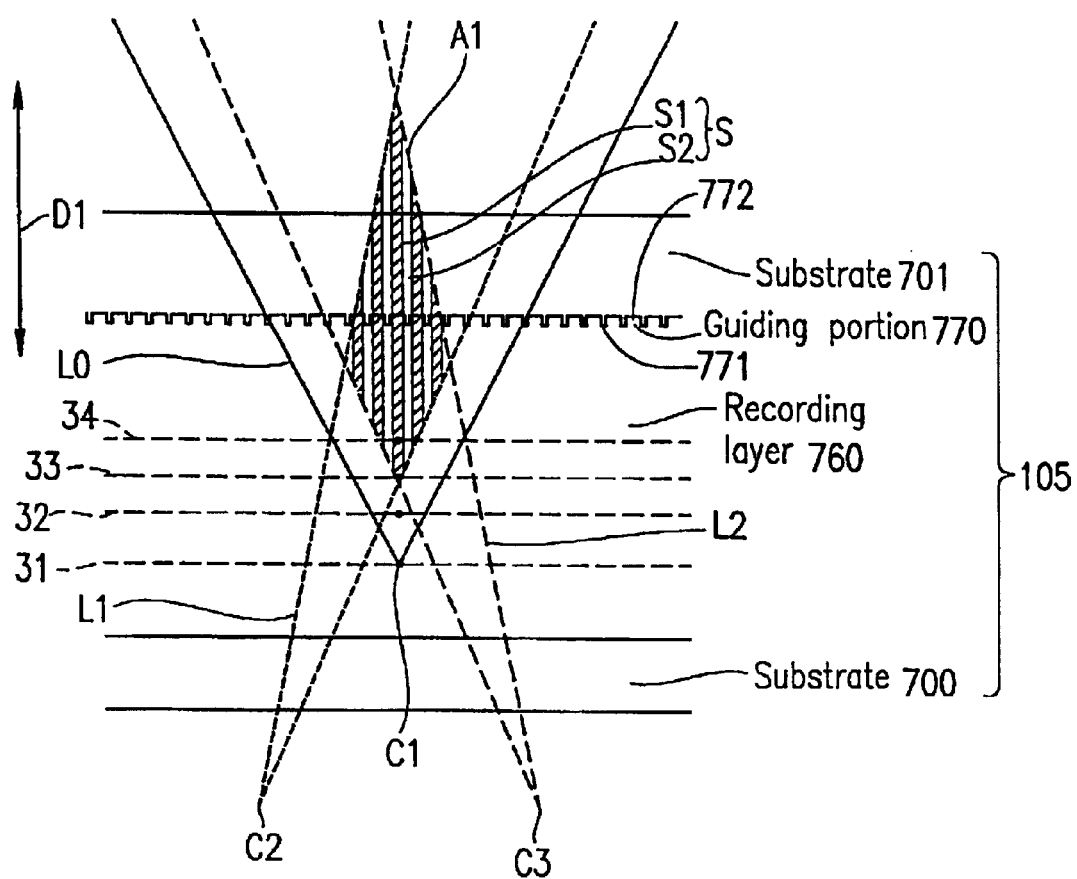
FIG. 3 is a cross-sectional view showing an optical disc according to an embodiment of the present invention.

FIG. 3 is a cross-sectional view showing the optical disc 105, the light beam L0, and the diffracted light beams L1 and L2. The optical disc 105 includes the recording layer 760 between the substrates 700 and 701. The recording layer 760 has a plurality of recording planes 31, 32, 33, and 34 on which information is recorded. The recording plane refers to a two-dimensional region in the recording layer 760 at a certain depth thereof. The convergence point C1 of the light beam L0 is positioned at a certain depth in the recording layer 760, whereby information can be recorded on a recording plane present at that depth.

Figure 4A:
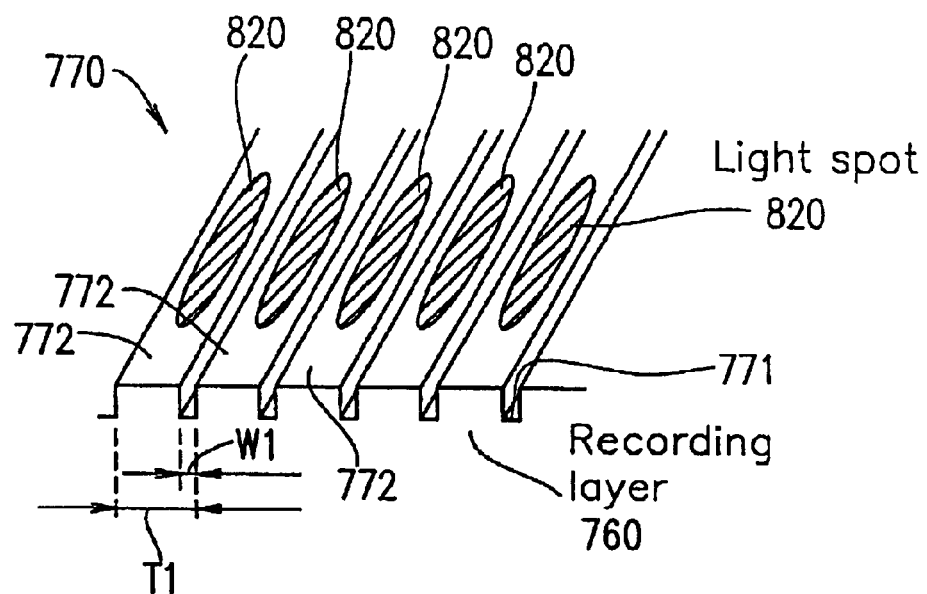
FIGS. 4A and 4B are perspective views showing a guiding portion and light spots formed thereon according to an embodiment of the present invention.

At the border between the substrate 701 and the recording layer 760, the guiding portion 770 which is made of a dielectric material or a metal thin film is formed. The concave portions 771 and the convex portions 772 of the guiding portion 770 are formed periodically along a radial direction of the optical disc 105. Referring to FIG. 4A, the width W1 of each concave portion 771 is smaller than a ½ of the interval T1 at which the concave portions 771 and the convex portions 772 are formed. The substrate 701 and the recording layer 760 are made of materials having substantially the same degree of refractive indices, in order to reduce a diffraction loss in a light beam transmitted through the substrate 701 and the recording layer 760.

As shown in FIG. 3, the diffracted light beams L1 and L2 diffracted by the hologram element 170 cross each other at a position in the vicinity of the guiding portion 770. Due to interference of the diffracted light beams L1 and L2 at a position where the diffracted light beams L1 and L2 cross each other, the interference fringes S which extend in a depth direction D1 of the optical disc 105 (i.e., in a direction substantially perpendicular to a surface of the optical disc 105) occur. The bright portions S1 and dark portions S2 of the interference fringes S occur alternately along the radial direction of the optical disc 105 similarly to the periodically formed concave portions 771 and the convex portions 772. In embodiment 1, tracking control is performed by the use of such interference fringes S.

Figure 4B:
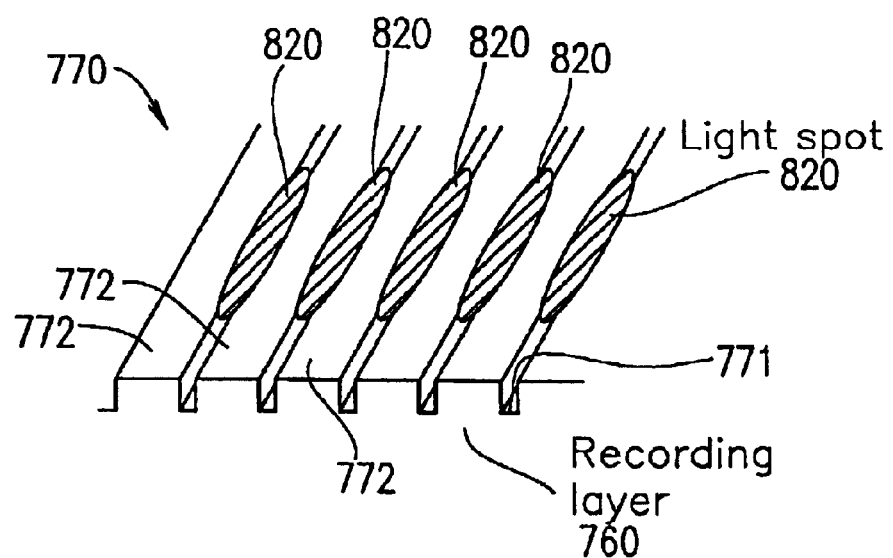

FIGS. 4A and 4B show examples of the light spots 820 which are formed by the bright portions S1 of the interference fringes S on the guiding portion 770. The difference between FIGS. 4A and 4B results from a difference in the positional relationship between the optical system 110 and the optical disc 105. In embodiment 1, the frequency at which the bright portions S1 and dark portions S2 of the interference fringes S occur is equal to the frequency at which the concave portions 771 and the convex portions 772 are formed. The frequency at which the bright portions S1 and dark portions S2 occur is set by adjusting a crossing angle of the diffracted light beams L1 and L2.

In the example illustrated in FIG. 4A, the light spots 820 are formed on the convex portions 772. In this state, the light spots 820 are not scattered by the concave portions 771, and accordingly, the light quantity of the interference fringes S reflected by the guiding portion 770 is relatively large.

In the example illustrated in FIG. 4B, large parts of the light spots 820 are formed on the concave portions 771. In this state, the light spots 820 are scattered by the concave portions 771, and accordingly, the light quantity of the interference fringes S reflected by the guiding portion 770 is relatively small.

As a result of a shift in a relative positions of the optical disc 105 and the optical system 110, the light spots 820 are formed on the guiding portion 770 of the rotating optical disc 105 such that the two states illustrated in FIGS. 4A and 4B alternately and periodically occur. Such periodical repetition of the two states periodically causes a variation in the intensity of the interference fringes S incident on the detection section 130. As shown in FIG. 2B, the interference fringes S incident on the detection section 130 form optical spots S1' thereon. The light receiving sections 131E and 131F output a detection signal 132 according to the intensity of the interference fringes S. The control section 121 generates a tracking signal based on the detection signal 132 for controlling the optical system 110 such that the light spots 820 follow the convex portions 772.

Figure 5:
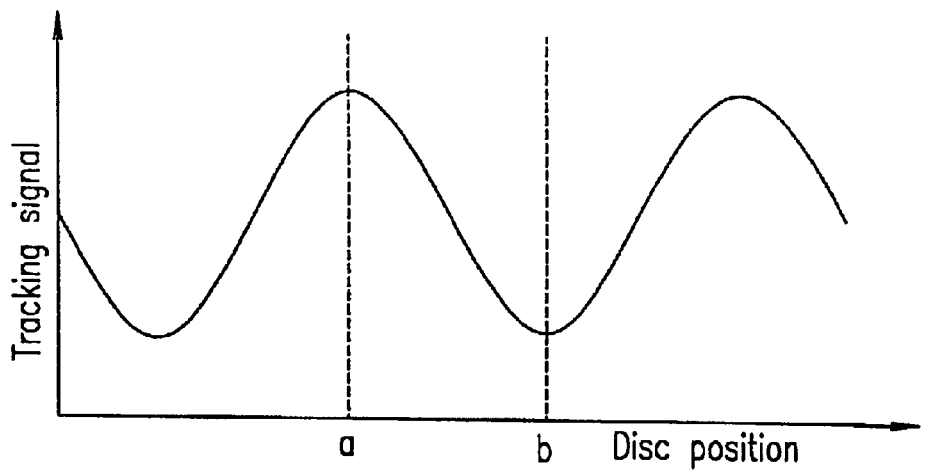
FIG. 5 is a graph showing a tracking signal according to an embodiment of the present invention.

FIG. 5 illustrates the relationship of a shift in the relative positions of the concave portions 771 and the convex portions 772 and the light spots 820 with respect to the tracking signal. Positions a and b shown in FIG. 5 correspond to the states illustrated in FIGS. 4A and 4B, respectively. The curve of FIG. 5 shows a variation in the value of the tracking signal when the relative positions of the concave portions 771 and the convex portions 772 and the light spots 820 are shifted along the radial direction of the optical disc 105.

The control section 121 controls the optical system 110 such that the value of the tracking signal is maintained to be constant, whereby tracking control of the light beam L0 is achieved. For example, when the control section 121 controls the optical system 110 such that the value of the tracking signal is maintained to be constant, the light spots 820 follow the convex portions 772. Thus, even in a recording operation wherein information is recorded at portion of the recording layer 760 where a concave/convex portion, such as those shown in FIG. 3, is not formed (e.g., recording planes 31, 32, 33, and 34), tracking control of the light beam L0 can be performed at a high accuracy.

Referring to FIG. 3, in the guiding portion 770, the concave portions 771 and the convex portions 772 are formed periodically along the radial direction of the optical disc 105 (i.e., along a direction parallel to the surfaces of the recording layer 760). The interference fringes S extend in a direction D1 substantially perpendicular to the surfaces of the recording layer 760. Thus, so long as the guiding portion 770 overlaps with an interference fringe formation region A1 in which the interference fringes S are formed, the light spots 820 can always be formed on the guiding portion 770 regardless of the position in the recording layer 760 of the convergence point C1 of the light beam L0 (e.g., whichever of the plurality of recording planes 31, 32, 33, and 34). Therefore, tracking control of the light beam L0 can be performed.

Further, since the detection section 130 can generates a detection signal based on an average value of the intensity distributions of all of the optical spots S1' (FIG. 2B), a reliable tracking signal can be obtained even when a portion of the guiding portion 770 is defective. Thus, tracking control can always be achieved in a reliable manner.

In the above-described example, tracking control is performed in recording information on, or reproducing information from, the optical disc 105 where the guiding portion 770 is formed at the interface of the substrate 701 and the recording layer 760. Alternatively, the principle of the present invention can be applied to tracking control which is performed in recording information on, or reproducing information from, an optical disc 105A shown in FIG. 6.

Figure 6:
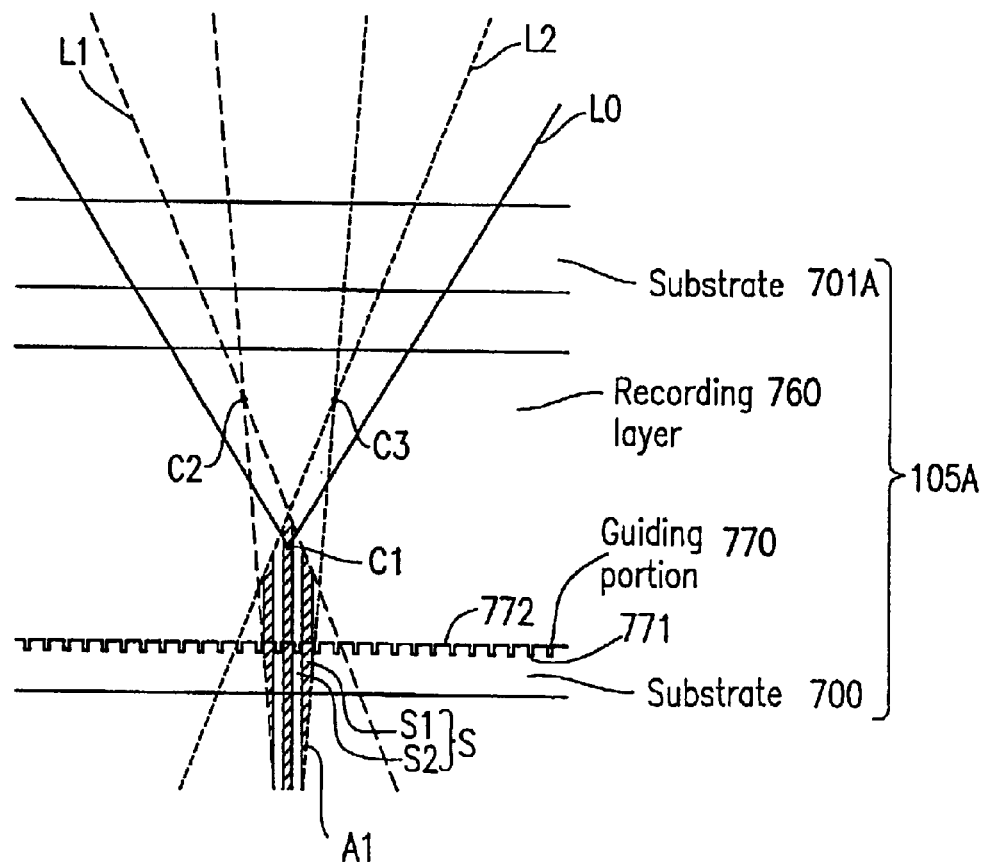
FIG. 6 is a cross-sectional view showing an optical disc according to an embodiment of the present invention.

Referring to FIG. 6, in the optical disc 105A, the guiding portion 770 is formed at the interface of the substrate 700 and the recording layer 760. The optical system 110 is positioned at the same side as the recording layer 760 with respect to the guiding portion 770. In this case, the hologram regions 171 and 172 of the hologram element 170 (FIG. 2A) is formed such that the interference fringes S form the light spots 820 on the guiding portion 770.

Figure 7A:
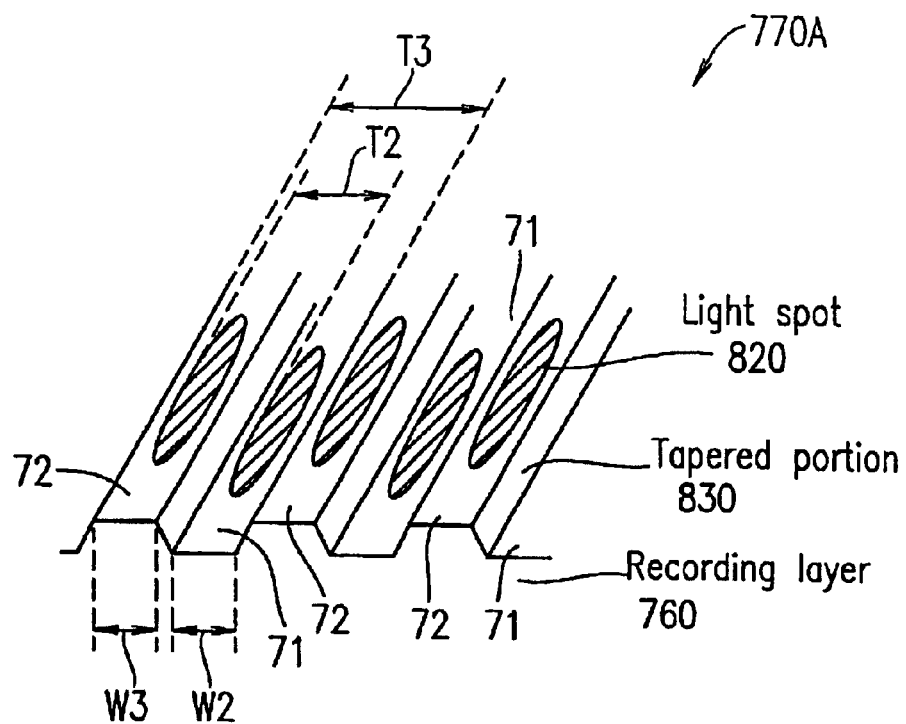
FIGS. 7A and 7B are perspective views showing a guiding portion and light spots formed thereon according to an embodiment of the present invention.
Figure 7B:
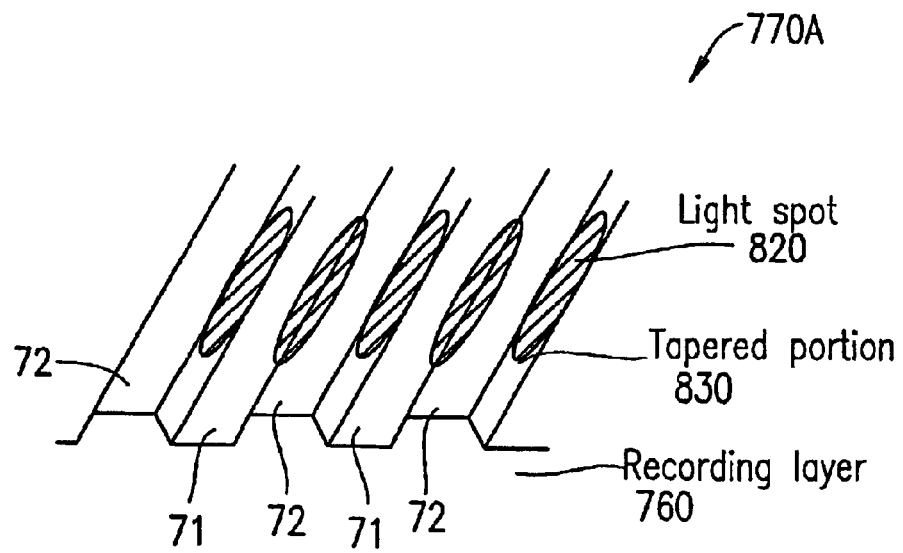

Alternatively, the optical disc 105 may have a guiding portion 770A shown in FIGS. 7A and 7B in place of the guiding portion 770. The guiding portion 770A has concave portions 71 and convex portions 72 which are formed alternately and periodically. The width W2 of each concave portion 71 and the width W3 of each convex portion 72, which are parallel to the radial direction of the optical disc 105, are substantially equal to each other. There are formed tapered portions 830 between the concave portions 71 and convex portions 72. The frequency T2 of the light spots 820 (i.e., the frequency of the interference fringes S) is a ½ of the frequency T3 at which the concave portions 71 and the convex portions 72 are formed. The concave portions 71 and the convex portions 72 include flat portions having the same width, and the tapered portions 830 are formed between the flat portions.

FIGS. 7A and 7B show examples of the light spots 820 formed on the guiding portion 770A. The difference between FIGS. 7A and 7B results from a difference in the positional relationship between the optical system 110 and the optical disc 105.

In the example illustrated in FIG. 7A, the light spots 820 are formed on the flat portions of the concave portions 71 and the convex portions 72. In this state, the light spots 820 are not scattered by the tapered portions 830, and accordingly, the light quantity of the interference fringes S reflected by the guiding portion 770A is relatively large.

In the example illustrated in FIG. 7B, on the other hand, the light spots 820 are formed on the tapered portions 830. In this state, the light spots 820 are scattered by the tapered portions 830, and accordingly, the light quantity of the interference fringes S reflected by the guiding portion 770A is relatively small.

A variation in the light quantity of the interference fringes S reflected by the guiding portion 770A due to a shift in the relative positions of the optical system 110 and the optical disc 105, whereby the previously-described tracking signal (e.g., see FIG. 5) can be obtained. With such a tracking signal, tracking control of the light beam L0 can be performed at a high accuracy.

Furthermore, the frequency T3 of the concave portions 71 and the convex portions 72 formed in the guiding portion 770A is about two times the frequency T2 of the light spots 820 (i.e., the frequency of the interference fringes S). The guiding portion 770A is formed such that the convex portions 72 are tapered at steps between the concave portions 71 and the convex portions 72. Therefore, the guiding portion 770A is advantageous in that it can be formed and duplicated readily even when an injection molding method is used.

It should be noted that the optical recording and/or reproduction apparatus 100 of the present invention is not limited to the recording and reproduction apparatus, but can be a recording-dedicated apparatus or a reproduction-dedicated apparatus.

(Embodiment 2)

Figure 8:
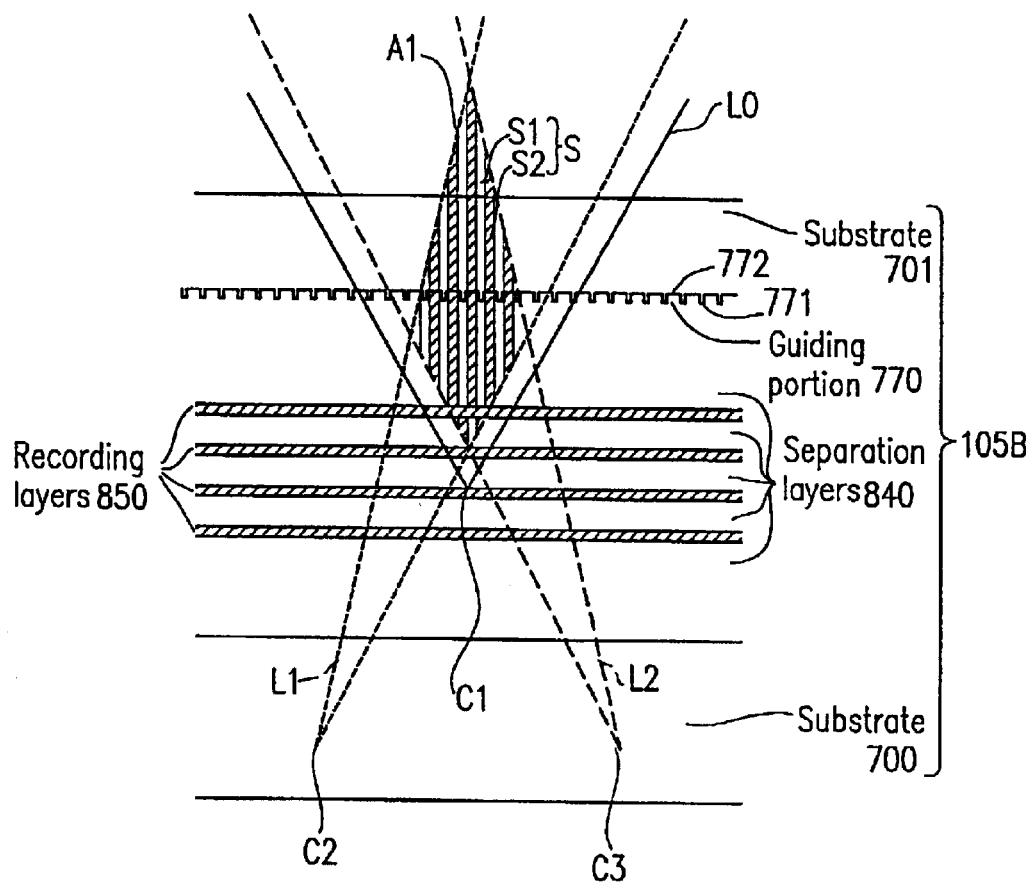
FIG. 8 is a cross-sectional view showing an optical disc according to an embodiment of the present invention.

Tracking control of the light beam L0 incident on an optical disc 105B shown in FIG. 8, which is performed using the optical recording and/or reproduction apparatus 100 of the present invention, is described. The optical disc 105B includes: a substrate 701 having a guiding portion 770; a substrate 700; and a plurality of recoding layers 850 and a plurality of separation layers 840, which are formed alternately between the substrate 701 and the substrate 700. The guiding portion 770 has concave portions 771 and convex portions 772. The plurality of recoding layers 850 contains an organic pigment, or the like. The plurality of recoding layers 850 are irradiated with a light beam, whereby information is recorded in the respective recording layers.

In embodiment 2 also, as described in embodiment 1, interference fringes S extend in a direction substantially perpendicular to the surfaces of the plurality of recoding layers 850. The optical system 110 outputs diffracted light beams L1 and L2 and a light beam L0 such that bright portions S1 of the interference fringes S form light spots 820 on the guiding portion 770 when a convergence point C1 of the light beam L0 is present within any of the plurality of recoding layers 850. A detection section 130 detects the interference fringes S reflected by the guiding portion 770 and outputs a detection signal 132. A control section 121 controls an optical system 110 based on the detection signal 132 such that the light spots 820 follow at least either of the concave portions 771 and the convex portions 772.

Since tracking control of the light beam L0 can be performed by utilizing the interference fringes S as described above, it is not necessary to form concave/convex portions on the surfaces of the recoding layers 850 or separation layers 840. Thus, the layered structure of the recoding layers 850 and separation layers 840 can be formed readily by spin coating, or the like. Therefore, such an optical disc can be produced at a low cost.

Herein, assume that the number of layers included in the recoding layers 850 is m (m is an integer equal to or greater than 2 (m≧2)). A layer of the m recoding layers 850, which is furthest from a surface of the optical disc 105B on which the light beam L0 is incident, is the first recording layer. A layer of the m recoding layers 850, which is closest to the surface of the optical disc 105B on which the light beam L0 is incident, is the mth recording layer. The m recoding layers 850 include an nth recoding layer and an (n−1)th recoding layer therebetween (n is an integer equal to or greater than 2 and equal to or smaller than m (2≦n≦m)), and the nth recoding layer is closer to the surface of the optical disc 105B on which the light beam L0 is incident than the (n−1)th recoding layer is. Among the recoding layers 850, the relationships, $R_{n-1} > R_n$ and $A_{n-1} > A_n$, are satisfied, where $R_n$ and $R_{n-1}$ respectively denote the reflectances of the nth and (n−1)th recoding layers, and $A_n$ and $A_{n-1}$ respectively denote the light absorptances of the nth and (n−1)th recoding layers. Among the plurality of recording layers 850, a recording layer closer to the surface of the optical disc 105B on which the light beam L0 is incident has smaller reflectance and light absorptance. With such an arrangement, a difference in the intensities of light beams reflected by the respective recording layers 850 can be reduced.

Alternatively, the plurality of recording layers 850 may be formed such that the following relationships are satisfied:

$$R_n = R_1/n \qquad (1)$$

$$A_n = A_1/n \qquad (2)$$

$$R_1 + A_1 = 1 \qquad (3)$$

where $R_n$ and $R_1$ respectively denote the reflectances of the nth and first recoding layers, and $A_n$ and $A_1$ respectively denote the light absorptances of the nth and first recoding layers. With such an arrangement, a reflected light beam has a constant intensity whichever of the recording layers 850 the light beam is converged on and reflected by. This feature of the present invention is described below in more detail.

Recording of information is performed with the light beam L0. Since the plurality of recording layers 850 are formed such that the absorption coefficient and reflectance of each recording layer satisfy the relationships (1), (2), and (3), the quantities of light absorbed by the respective recording layers are the same even when the intensity of the light beam L0 is constant. This can be supported by the following explanations. The quantity of light absorbed by the nth recording layer, $PA_n$, is influenced by an attenuation of the light beam L0 due to reflection and absorption in the recording layers lying above the nth recording layer, and accordingly, the light quantity $PA_n$ is expressed by the following expression:

$$PA_n = A_n \cdot P_W \cdot \prod_{k=n+1}^{m} \left(1 - \frac{R_1 + A_1}{k}\right) \quad (4)$$

where $P_W$ denotes the intensity of the light beam L0, and m denotes the number of recording layers 850. In view of expressions (2) and (3), expression (4) can be modified as follows:

$$PA_n = P_W \cdot \frac{A_1}{m} \quad (5)$$

As appreciated from expression (5), the light quantity $PA_n$ absorbed by each recording layer does not depend on variable n. That is, the absorbed light quantities $PA_n$ in the respective recording layers are the same so long as the intensity $P_W$ of the light beam L0 is constant. This means that information can be recorded in the respective recording layers with the light beam L0 having a constant intensity.

In many optical recording and/or reproduction apparatuses, the available range of the intensity of the light beam L0 is limited. Even in such a case, according to the present invention, information can be recorded in an optical recording medium having multiple recording layers with the light beam L0 having a constant intensity.

When the intensity of the light beam L0 reflected by the optical disc 105B is very low, it is desirable that an avalanche photodiode (APD) is used as a light receiving element of the detection section 130 for reproduction of information. In this case, the detection section 130 is formed in a sufficiently small size so as not to receive a light beam reflected from unintended portions of the recording layers.

In reproduction of information, a light beam reflected by a recording layer 850 containing information to be reproduced is attenuated due to reflection and absorption in other recording layers. If the reflectances and absorption rates of the respective recording layers are the same, a light beam reflected by a lower recording layer is more attenuated in comparison to a light beam reflected by an upper recording layer. Thus, an APD used as a light receiving element of the detection section 130 is required to have a dynamic range which allows reception of light beams reflected by all recording layers from the lowermost recording layer to the uppermost recording layer. However, in the case where the reflectances and absorption rates of the respective recording layers are the same, the APD may not be able to produce a sufficient multiplication factor. In such a case of using the APD, the intensity of the light beam L0 might have to be increased for performing reproduction of information in a lower recording layer. However, on the other hand, there is an upper limit to the intensity of the light beam L0 in an information reproduction system because the light beam L0 having an excessive intensity may erroneously erase information recorded in a recording medium.

On the other hand, in the multiple recording layers 850 formed according to the present invention so as to satisfy expressions (1), (2), and (3), the quantity of a light beam received by the APD is constant regardless of which of the recording layers 850 the light beam is reflected from. Thus, it is substantially unnecessary to change the intensity of the light beam L0. The light quantity $PS_n$ of a light beam received by the APD is expressed in expression (6):

$$PS_n = P_R \cdot R_n \cdot \prod_{k=n+1}^{m} \left(1 - \frac{R_1 + A_1}{k}\right) \quad (6)$$

where $P_R$ denotes the intensity of the light beam L0 at a recording layer from which information is reproduced. The value $P_R$ is a constant value set so as not to cause the above-described erroneous erasure of information. In view of expressions (2) and (3), expression (6) can be modified as follows:

$$PS_n = P_R \cdot \frac{R_1}{m} \quad (7)$$

As appreciated from expression (7), the value $PS_n$ is constant regardless of which recording layer the light beam is reflected by. Thus, according to the present invention, a sufficient multiplication factor can be obtained with an APD even when the light beam L0 used has a sufficiently low intensity so that an erroneous erasure of information is not caused. Therefore, reproduction of information can be performed satisfactorily and desirably.

(Embodiment 3)

Tracking control performed by the optical recording and/or reproduction apparatus 100 according to embodiment 3 of the present invention is described below.

In embodiments 1 and 2, a tracking signal detected based on interference fringes S reflected by the guiding portion 770 or 770A exhibits a characteristic shown in FIG. 5. The optical system 110 is controlled such that the value of the tracking signal is maintained to be constant, whereby accurate tracking control can be achieved.

The reflectance of the guiding portion is sometimes varied due to a production error of an optical disc, or any other reason. In such a case, it cannot be determined whether a variation of the tracking signal is caused due to a shift in position of the optical disc or due to the variation in reflectance of the guiding portion which is caused by a production error or the like. Thus, it is difficult to achieve accurate tracking control.

A tracking control method of the present invention which addresses such a problem is described.

According to embodiment 3, the optical recording and/or reproduction apparatus 100 includes a hologram element 170A (FIG. 9A) in place of the hologram element 170 described in embodiment 1. As shown in FIG. 9A, the hologram element 170A has four hologram regions 173, 174, 175, and 176. The four hologram regions 173, 174, 175, and 176 diffract a portion of the light beam L so as to output different diffracted light beams L3, L4, L5, and L6, respectively.

Hereinafter, an operation of the optical recording and/or reproduction apparatus 100 is described with reference to FIGS. 9A to 9C, 10A to 10C, and 11A to 11C.

Figure 9B:
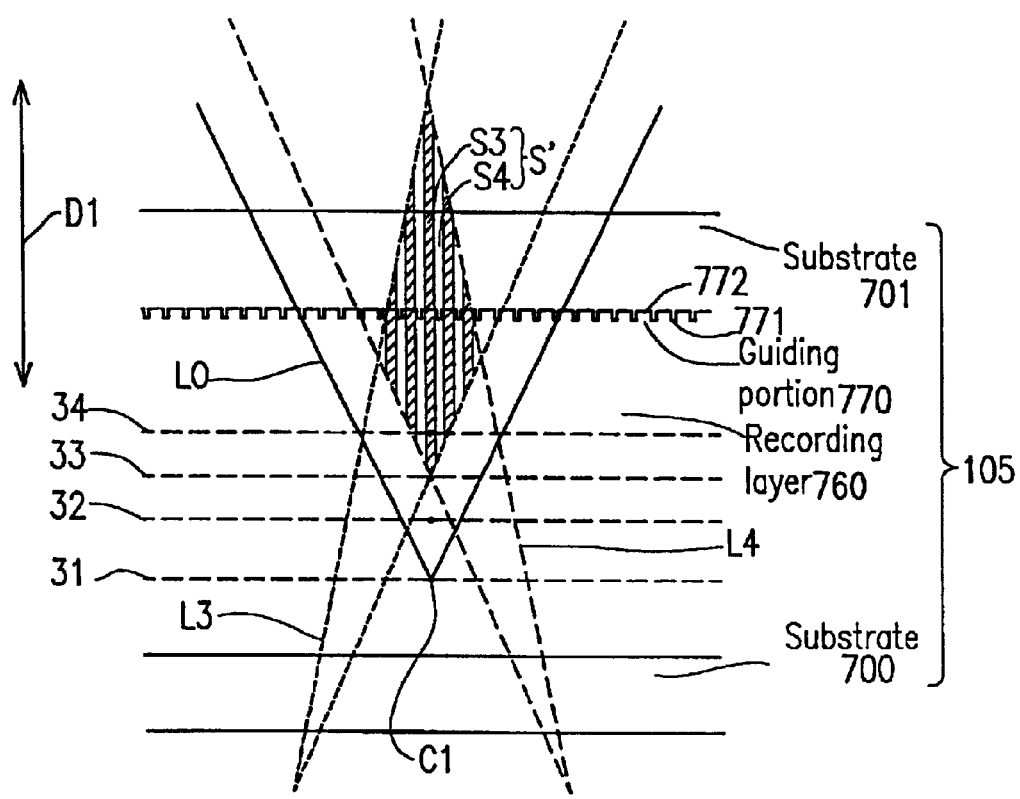
FIGS. 9B and 9C are cross-sectional views showing an optical disc according to an embodiment of the present invention.
Figure 9C:
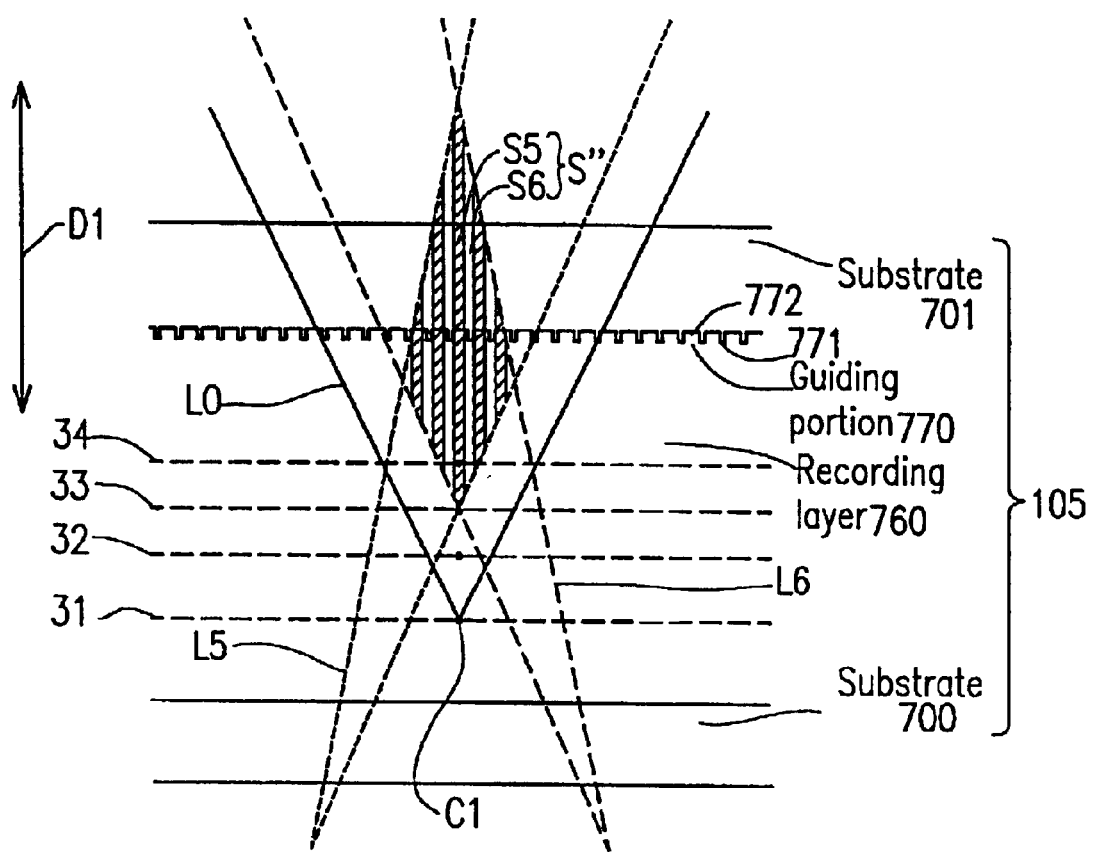

FIG. 9B is a cross-sectional view of an optical disc 105, a light beam L0, and diffracted light beams L3 and L4. FIG. 9C is another cross-sectional view of the optical disc 105, which is different from the cross-section shown in FIG. 9B. The cross-section of FIG. 9C includes the light beam L0, and diffracted light beams L5 and L6.

As shown in FIG. 9B, the diffracted light beams L3 and L4 interfere with each other, whereby first interference fringes S' which extend in a direction substantially perpendicular to the surfaces of the recording layer 760 occur. Similarly, as shown in FIG. 9C, the diffracted light beams L5 and L6 interfere with each other, whereby second interference fringes S" which extend in a direction substantially perpendicular to the surfaces of the recording layer 760 occur.

The first interference fringes S' include bright portions S3 and dark portions S4 which alternately occur along the radial direction of the optical disc 105. The second interference fringes S" include bright portions S5 and dark portions S6 which alternately occur along the radial direction of the optical disc 105. The frequency of the bright portions S3 and dark portions S4 in the first interference fringes S' and the frequency of the bright portions S5 and dark portions S6 in the second interference fringes S" are shifted along the radial direction of the optical disc 105. Characteristics of the first interference fringes S' and the second interference fringes S" are the same as that of the interference fringes S of embodiment 1.

The optical system 110 outputs the diffracted light beams L1, L2, L3, and L4, and a second light beam such that the bright portions S3 form light spots 821A (FIG. 10A) on the guiding portion 770 and the bright portions S5 form light spots 821B (FIG. 10A) on the guiding portion 770 when the convergence point C1 of the light beam L0 is present within the recording layer 760. The detection section 130 detects the first interference fringes S' and the second interference fringes S", which are reflected by the guiding portion 770, so as to output a detection signal 132. The control section 121 controls the optical system 110 based on the detection signal 132 such that the light spots follow at least either of the concave portions 771 and the convex portions 772.

Figure 10A:
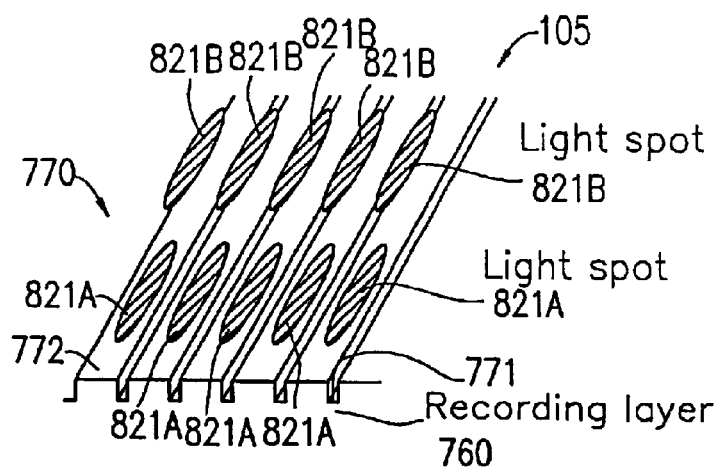
FIGS. 10A, 10B, and 10C are perspective views showing a guiding portion and light spots formed thereon according to an embodiment of the present invention.
Figure 10B:
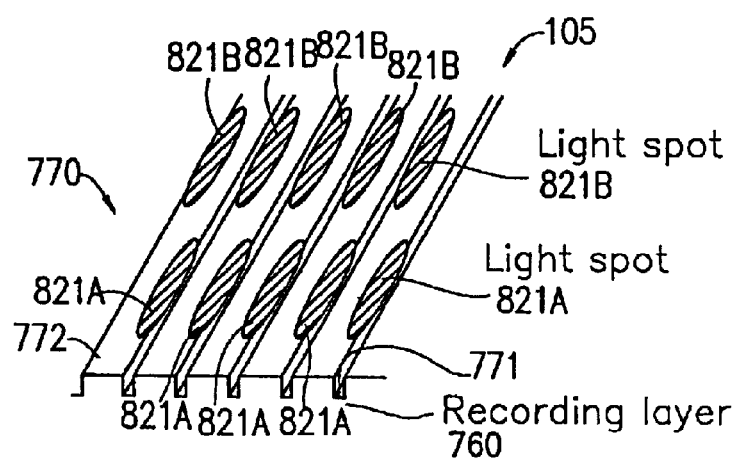
Figure 10C:
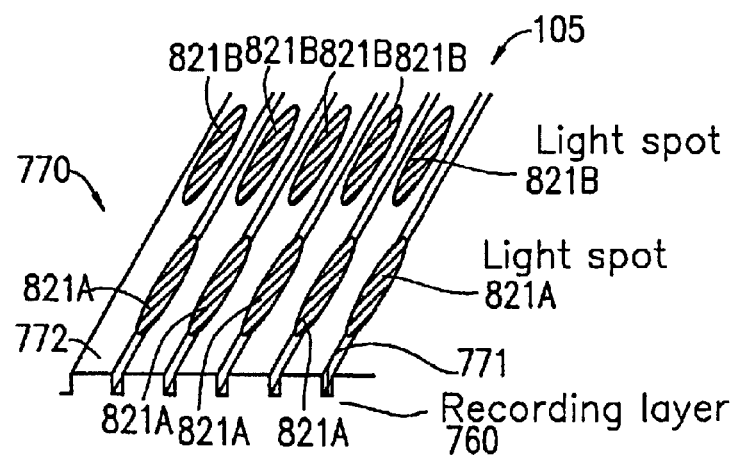

FIGS. 10A, 10B, and 10C show positional relationships of the light spots 821A and 821B and the guiding portion 770 of the optical disc 105. The difference between FIGS. 10A, 10B, and 10C results from a difference in relative positions of the optical system 110 and the optical disc 105.

As shown in FIGS. 10A, through 10C, the frequency of the bright portions S3 and dark portions S4 in the first interference fringes S' is equal to the frequency of the bright portions S5 and dark portions S6 in the second interference fringes S". The hologram regions 173, 174, 175, and 176 (FIG. 9A) are designed such that the frequencies of the first interference fringes S' and second interference fringes S" are equal to the frequency at which the concave portions 771 and convex portions 772 are formed. The pattern of the hologram regions 173, 174, 175, and 176 is designed such that the positions of the light spots 821A are shifted with respect to the positions of the light spots 821B by a half of an interval at which the concave portions 771 and convex portions 772 are formed.

Figure 2C:
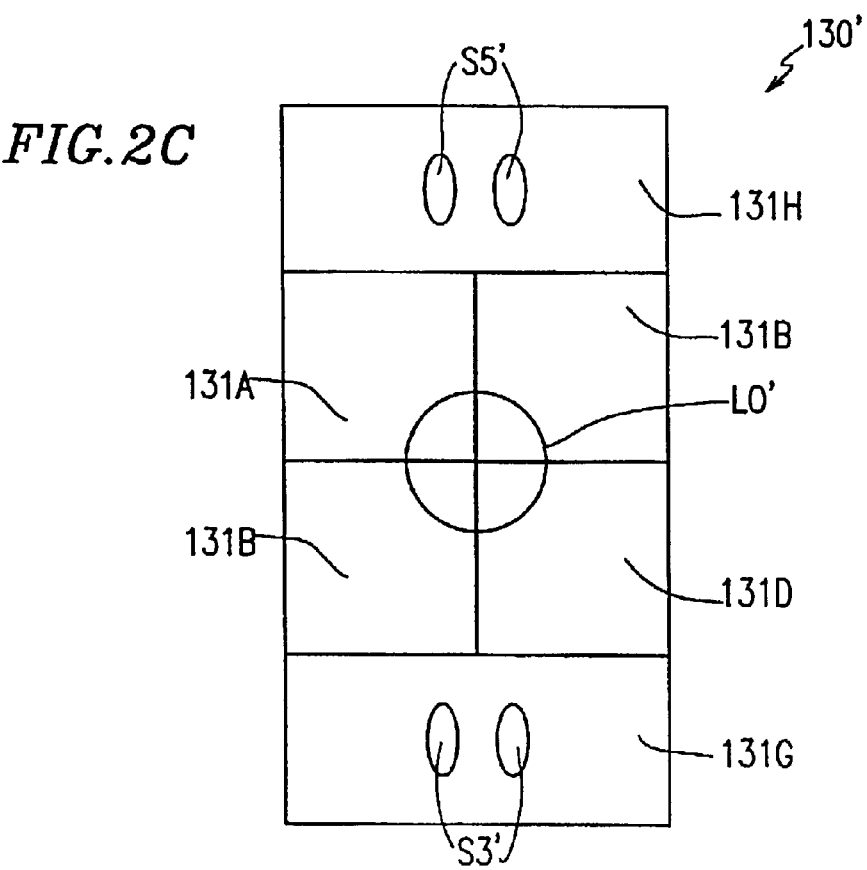
FIG. 2C is a plan view showing another detection section according to an embodiment of the present invention.

In embodiment 3, the optical recording and/or reproduction apparatus 100 includes a detection section 130' shown in FIG. 2C in place of the detection section 130 described in embodiment 1. The detection section 130' has six light receiving sections 131A, 131B, 131C, 131D, 131G, and 131H. The functions of the light receiving sections 131A, 131B, 131C, 131D, 131G, and 131H of the detection section 130' are the same as those of the light receiving sections 131A, 131B, 131C, 131D, 131E, and 131F of the detection section 130 shown in FIG. 2B. The light beam L0 incident on the detection section 130' forms a light spot L0'. The first interference fringes S' and the second interference fringes S" are reflected by the guiding portion 770 under the influence of the concave portions 771. The reflected first interference fringes S' and second interference fringes S" reach light receiving sections 131G and 131H so as to form light spots S3' and S5' thereon. For example, the first interference fringes S' is received by the light receiving section 131G, whereas the second interference fringes S1 is received by the light receiving section 131H. In response to the reception of the first interference fringes S' and the second interference fringes S", the light receiving section 131G produces a signal A, and the light receiving section 131H produces a signal B. The signals A and B are included in the detection signal 132. A method for producing a tracking signal is described with reference to 10A, 10B, and 10C, and 11A, 11B, and 11C.

Figure 11A:
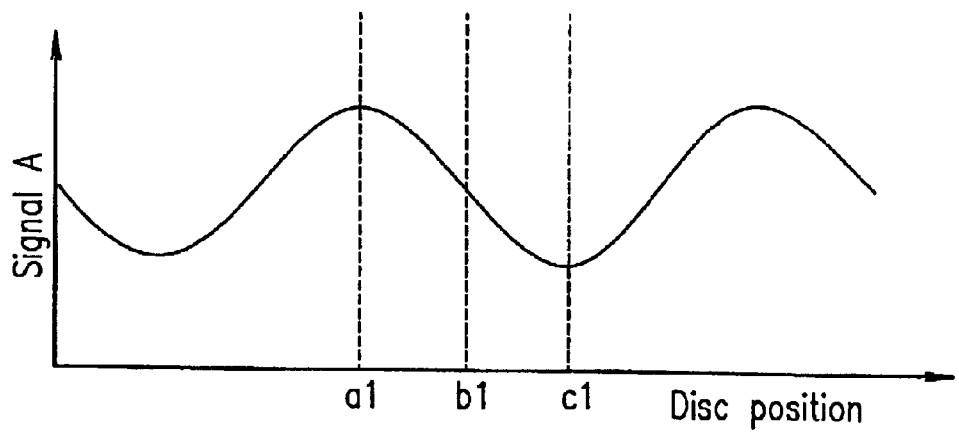
FIGS. 11A, 11B, and 11C are graphs showing detection signals according to an embodiment of the present invention.
Figure 11B:
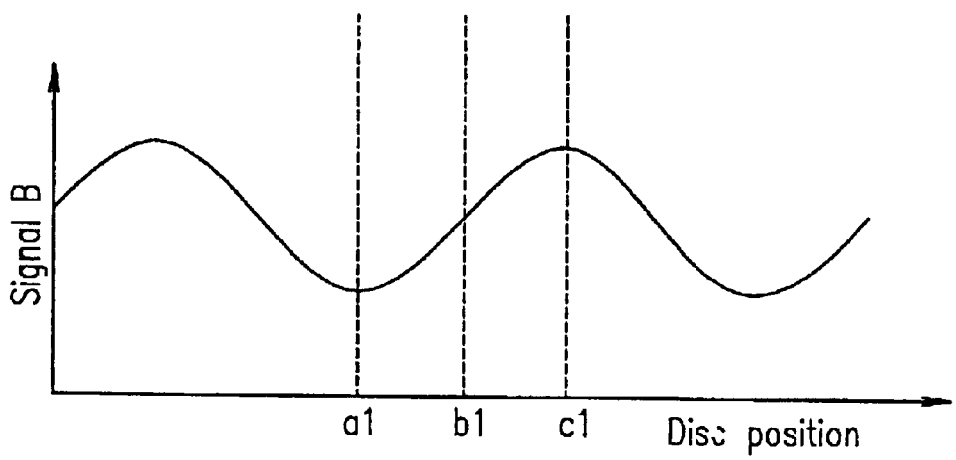
Figure 11C:
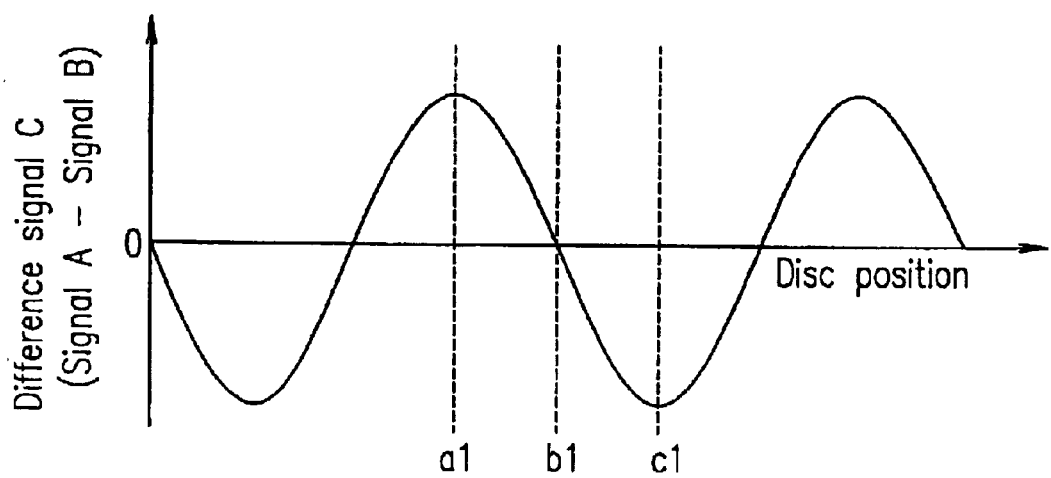
Figure 12:
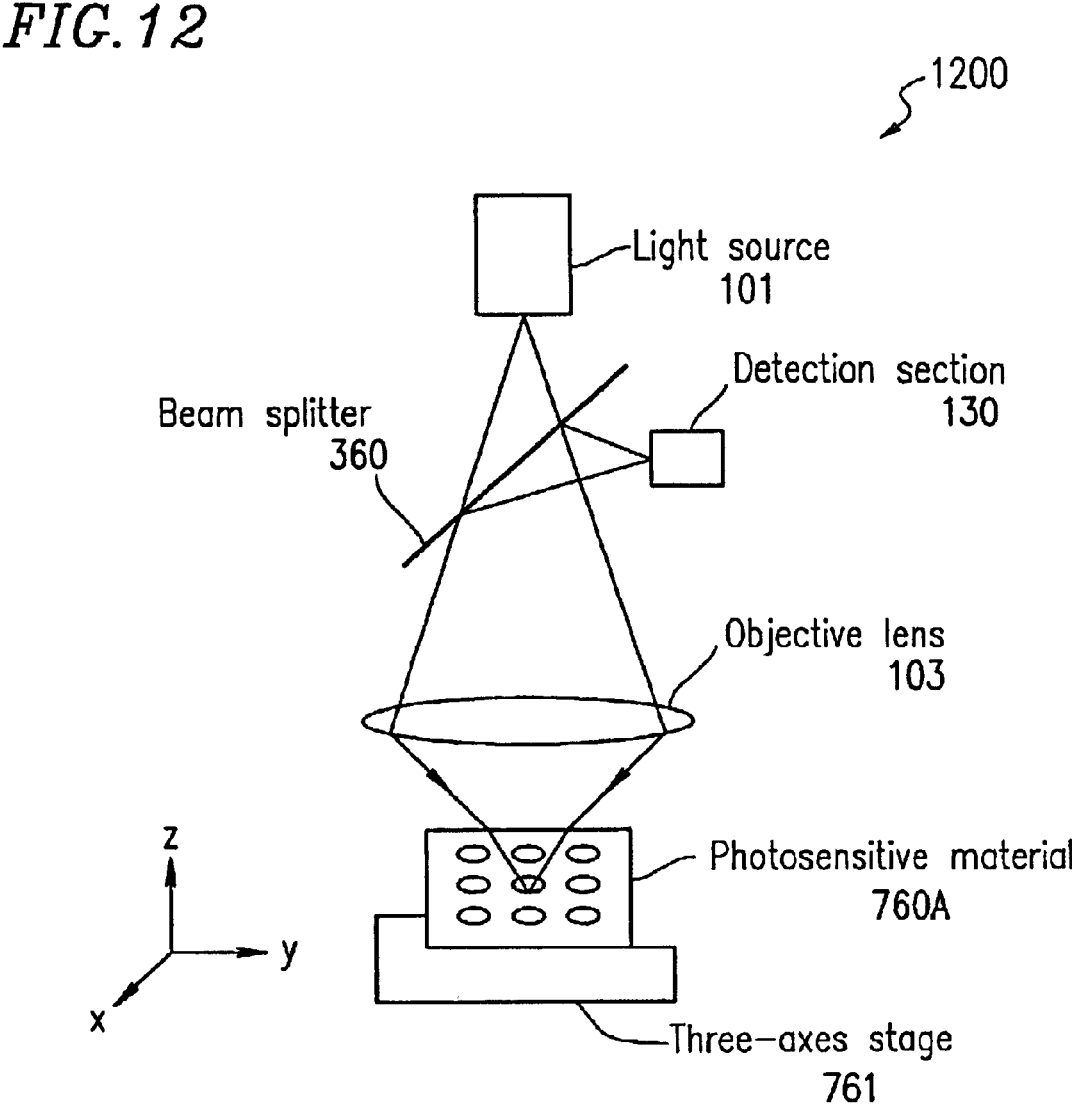
FIG. 12 shows a conventional optical recording and/or reproduction apparatus.

FIGS. 11A, 11B, and 11C show relationships between each of the signal A, the signal B, and a difference signal C (which represents a difference between the signals A and B), and the position of the optical disc 105. The following descriptions are made while referring also to the three states of the light spots 821A and 821B shown in FIGS. 10A, 10B, and 10C.

In the case where the optical disc 105 is shifted leftward of FIG. 11A (corresponding to a position a1 of the optical disc 105 in FIGS. 11A, 11B, and 11C), the first interference fringes S' form the light spots 821A on flat portions of the convex portions 772. Thus, the light quantity of the first interference fringes S' reflected by the guiding portion 770 increases. Accordingly, the value of the signal A increases. On the other hand, the second interference fringes S1 form the light spots 821B on the concave portions 771. Thus, the light quantity of the second interference fringes S' reflected by the guiding portion 770 decreases. Accordingly, the value of the signal B decreases. As a result, the difference signal C has a positive value.

In the case where the optical disc 105 is shifted rightward of FIG. 10C (corresponding to a position c1 of the optical disc 105 in FIGS. 11A, 11B, and 11C), the first interference fringes S1 form the light spots 821A on the concave portions 771. Thus, the light quantity of the first interference fringes S' reflected by the guiding portion 770 decreases. Accordingly, the value of the signal A decreases. On the other hand, the second interference fringes S" form the light spots 821B on the flat portions of the convex portions 772. Thus, the light quantity of the second interference fringes S" reflected by the guiding portion 770 increases. Accordingly, the value of the signal B increases. As a result, the difference signal C has a negative value.

In the case where the optical disc 105 is positioned at an intermediate position between the positions a1 and c1 as shown in FIG. 10B, both the light spots 821A and the light spots 821B are formed on the flat portions of the convex portions 772. Thus, the light quantity of the reflected first interference fringes S' is equal to the light quantity of the reflected second interference fringes S". Therefore, the value of the signal A is equal to the value of the signal B. As a result, the value of the difference signal C is 0.

As described above, the value of the difference signal C periodically varies according to the position of the optical disc 105 with respect to value 0 as a reference as shown in FIG. 11C. Thus, although the values of the signals A and B vary when the reflectance of the guiding portion is varied due to a production error or the like, the position of the optical disc 105 is always the same when the value of the difference signal C is 0. Thus, the optical system 110 is controlled such that the value of the difference signal C is maintained to be 0, whereby accurate tracking control can be achieved.

In the above description of embodiment 3, the optical disc 105 (FIG. 3) is used, but embodiment 3 is not limited thereto. The same effects can be achieved even when an optical disc having a different structure, such as the optical disc 105A (FIG. 6) or the optical disc 105B (FIG. 8), is employed.

According to the present invention, there is provided an optical recording and/or reproduction apparatus where bright portions of interference fringes form optical spots on a guiding portion such that the optical spots follow at least either of concave portions and convex portions of the guiding portion. By allowing the optical spots to follow at least either of concave portions and convex portions, tracking control of a light beam whose convergence point is in a recording layer can be performed.

Further, according to the present invention, there is provided an optical recording medium including m recording layers (m is an integer equal to or greater than 2 (m≧2)). In this optical recording medium of the present invention, a layer of the m recoding layers, which is furthest from a first surface of the recording medium on which a light beam is incident, is referred to as the first recording layer; and a layer of the m recoding layers, which is closest to the first surface of the recording medium, is referred to as the mth recording layer. The m recoding layers further include nth and (n−1)th recoding layers (n is an integer equal to or greater than 2 and equal to or smaller than m (2≦n≦m)), and the nth recoding layer is closer to the first surface of the recording medium than the (n−1)th recoding layer is. Among the m recoding layers, the relationships, $R_{n-1}>R_n$ and $A_{n-1}>A_n$, are satisfied, where $R_n$ and $R_{n-1}$ respectively denote the reflectances of the nth and (n−1)th recoding layers, and $A_n$ and $A_{n-1}$ respectively denote the light absorptances of the nth and (n−1)th recoding layers. With such an arrangement, a difference in the intensities of light beams reflected by the respective recording layers can be reduced.

Furthermore, there is provided an optical recording medium including a plurality of recording layers, wherein the following relationships are satisfied:

$$R_n = R_1/n$$

$$A_n = A_1/n$$

$$R_1 + A_1 = 1$$

where $R_n$ and $R_1$ respectively denote the reflectances of the nth and first recoding layers, and $A_n$ and $A_1$ respectively denote the light absorptances of the nth and first recoding layers. With such an arrangement, a reflected light beam has a constant intensity regardless of the recording layers the light beam is converged on and reflected by.

According to the present invention, there is provided an optical recording and/or reproduction apparatus capable of performing high-accuracy tracking control of a light beam used for recording/reproduction of information on an optical recording medium having a plurality of recording layers or recording planes. Further still, according to the present invention, there is provided a method for performing such a tracking control.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An optical recording and/or reproduction apparatus for use with an optical recording medium, the optical recording medium including a recording layer and a substrate which has a guiding portion where concave portions and convex portions are periodically formed along a predetermined direction, the optical recording and/or reproduction apparatus comprising:

a light source for emitting a first light beam;

an optical system for diffracting a portion of the first light beam so as to output a first diffracted light beam and a second diffracted light beam, and for converging the other portion of the first light beam, thereby outputting a second light beam so as to be converged at a predetermined convergence point; and a controlling section for controlling the optical system, wherein the first and second diffracted light beams interfere with each other to generate interference fringes which extend in a direction substantially perpendicular to the recording layer, the interference fringes include bright portions and dark portions which occur alternately along the predetermined direction, the optical system outputs the first and second diffracted light beams and the second light beam such that the bright portions of the interference fringes form light spots on the guiding portion when the predetermined convergence point of the second light beam is present within the recording layer, the optical recording and/or reproduction apparatus further includes a detection section for detecting the interference fringes reflected by the guiding portion so as to output a detection signal, and the control section controls the optical system based on the detection signal such that the optical spots follow at least either of the concave portions and the convex portions.

2. An optical recording and/or reproduction apparatus according to claim 1, wherein:

the recording layer includes a plurality of recording planes; and the control section controls the optical system such that the predetermined convergence point of the second light beam is positioned on one of the plurality of recording planes.

3. An optical recording and/or reproduction apparatus according to claim 1, wherein the frequency of the interference fringes is equal to the frequency at which the concave portions and convex portions are formed.

4. An optical recording and/or reproduction apparatus according to claim 1, wherein the frequency of the interference fringes is a half of the frequency at which the concave portions and convex portions are formed.

5. An optical recording and/or reproduction apparatus according to claim 1, wherein the optical system is positioned at an opposite side to the recording layer with respect to the guiding portion.

6. An optical recording and/or reproduction apparatus according to claim 1, wherein the optical system is positioned at the same side as the recording layer with respect to the guiding portion.

7. An optical recording and/or reproduction apparatus according to claim 1, wherein:

the detection section further detects the second light beam reflected by the recording layer so as to output the detection signal; and the optical recording and/or reproduction apparatus further includes a reproduction section for reproducing information recorded in the recording layer based on the detection signal.

8. An optical recording and/or reproduction apparatus according to claim 1, further comprising a recording section for generating a recording current which is used for recording information on the recording layer,
   wherein the light source emits the first light beam based on the recording current.

9. A tracking method for use with an optical recording medium, the optical recording medium including a recording layer and a substrate which has a guiding portion where concave portions and convex portions are periodically formed along a predetermined direction, the method comprising steps of:
   (a) emitting a first light beam;
   (b) diffracting a portion of the first light beam so as to output a first diffracted light beam and a second diffracted light beam, and for converging the other portion of the first light beam, thereby outputting a second light beam so as to be converged at a predetermined convergence point; and
   (c) controlling the optical system,
   wherein the first and second diffracted light beams interfere with each other to generate interference fringes which extend in a direction substantially perpendicular to the recording layer,
   the interference fringes include bright portions and dark portions which occur alternately along the predetermined direction,
   the step (b) includes a step of (d) outputting the first and second diffracted light beams and the second light beam such that the bright portions of the interference fringes form light spots on the guiding portion when the predetermined convergence point of the second light beam is present within the recording layer,
   the tracking method further includes a step of (e) detecting the interference fringes reflected by the guiding portion so as to output a detection signal, and
   the step (c) includes a step of (f) controlling the optical system based on the detection signal such that the optical spots follow at least either of the concave portions and the convex portions.

10. An optical recording and/or reproduction apparatus for use with an optical recording medium, the optical recording medium including a recording layer and a substrate which has a guiding portion where concave portions and convex portions are periodically formed along a predetermined direction, the optical recording and/or reproduction apparatus comprising:
   a light source for emitting a first light beam;
   an optical system for diffracting a portion of the first light beam so as to output a first diffracted light beam, a second diffracted light beam, a third diffracted light beam, and a fourth diffracted light beam, and for converging the other portion of the first light beam, thereby outputting a second light beam so as to be converged at a predetermined convergence point; and
   a controlling section for controlling the optical system,
   wherein the first and second diffracted light beams interfere with each other to generate first interference fringes which extend in a direction substantially perpendicular to the recording layer,
   the third and fourth diffracted light beams interfere with each other to generate second interference fringes which extend in a direction substantially perpendicular to the recording layer,
   the first and second interference fringes include bright portions and dark portions which occur alternately along the predetermined direction,
   the frequency of the first interference fringes and the frequency of the second interference fringes are shifted with respect to each other along the predetermined direction,
   the optical system outputs the first, second, third, and fourth diffracted light beams and the second light beam such that the bright portions of the first and second interference fringes form light spots on the guiding portion when the predetermined convergence point of the second light beam is present within the recording layer,
   the optical recording and/or reproduction apparatus further includes a detection section for detecting the first and second interference fringes reflected by the guiding portion so as to output a detection signal, and
   the control section controls the optical system based on the detection signal such that the optical spots follow at least either of the concave portions and the convex portions.

11. An optical recording and/or reproduction apparatus for use with an optical recording medium, the optical recording medium including a plurality of recording layers and a substrate which has a guiding portion where concave portions and convex portions are periodically formed along a predetermined direction, the optical recording and/or reproduction apparatus comprising:
   a light source for emitting a first light beam;
   an optical system for diffracting a portion of the first light beam so as to output a first diffracted light beam and a second diffracted light beam, and for converging the other portion of the first light beam, thereby outputting a second light beam so as to be converged at a predetermined convergence point; and
   a controlling section for controlling the optical system,
   wherein the first and second diffracted light beams interfere with each other to generate interference fringes which extend in a direction substantially perpendicular to the plurality of recording layers,
   the interference fringes include bright portions and dark portions which occur alternately along the predetermined direction,
   the optical system outputs the first and second diffracted light beams and the second light beam such that the bright portions of the interference fringes form light spots on the guiding portion when the predetermined convergence point of the second light beam is present within one of the plurality of recording layers,
   the optical recording and/or reproduction apparatus further includes a detection section for detecting the interference fringes reflected by the guiding portion so as to output a detection signal, and
   the control section controls the optical system based on the detection signal such that the optical spots follow at least either of the concave portions and the convex portions.

12. A tracking method for use with an optical recording medium, the optical recording medium including a plurality of recording layers and a substrate which has a guiding portion where concave portions and convex portions are periodically formed along a predetermined direction, the method comprising steps of:
   (a) emitting a first light beam;
   (b) diffracting a portion of the first light beam so as to output a first diffracted light beam and a second diffracted light beam, and for converging the other portion of the first light beam, thereby outputting a second light beam so as to be converged at a predetermined convergence point; and (c) controlling the optical system, wherein the first and second diffracted light beams interfere with each other to generate interference fringes which extend in a direction substantially perpendicular to the plurality of recording layers, the interference fringes include bright portions and dark portions which occur alternately along the predetermined direction, the step (b) includes a step of (d) outputting the first and second diffracted light beams and the second light beam such that the bright portions of the interference fringes form light spots on the guiding portion when the predetermined convergence point of the second light beam is present within one of the plurality of recording layers, the tracking method further includes a step of (e) detecting the interference fringes reflected by the guiding portion so as to output a detection signal, and the step (c) includes a step of (f) controlling the optical system based on the detection signal such that the optical spots follow at least either of the concave portions and the convex portions.

\* \* \* \* \*